(12) United States Patent
Peng et al.

(10) Patent No.: US 12,425,891 B2
(45) Date of Patent: Sep. 23, 2025

(54) METHODS, APPARATUSES, AND SYSTEMS FOR INTELLIGENT INTERFERENCE MANAGEMENT AND RADIO RESOURCE MANAGEMENT

(71) Applicant: Lenovo (Beijing) Ltd., Beijing (CN)

(72) Inventors: Tao Peng, Haidian District (CN); Yichen Guo, Haidian District (CN); Haiming Wang, Xicheng District (CN); Xin Guo, Chaoyang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 587 days.

(21) Appl. No.: 17/801,433

(22) PCT Filed: Feb. 27, 2020

(86) PCT No.: PCT/CN2020/077031
§ 371 (c)(1),
(2) Date: Aug. 22, 2022

(87) PCT Pub. No.: WO2021/168753
PCT Pub. Date: Sep. 2, 2021

(65) Prior Publication Data
US 2023/0107244 A1  Apr. 6, 2023

(51) Int. Cl.
*H04W 24/08* (2009.01)
(52) U.S. Cl.
CPC ................................. *H04W 24/08* (2013.01)
(58) Field of Classification Search
CPC ..................................................... H04W 24/08
See application file for complete search history.

(56) References Cited

U.S. PATENT DOCUMENTS

2010/0029282 A1  2/2010  Stamoulis et al.
2016/0165469 A1  6/2016  Gopalakrishnan et al.
(Continued)

FOREIGN PATENT DOCUMENTS

CN  102090096 A  6/2011
CN  102740447 A  10/2012
(Continued)

OTHER PUBLICATIONS 202080097083.4 , "Foreign Office Action", CN Application No. 202080097083.4, Oct. 23, 2024, 18 pages.
(Continued)

*Primary Examiner* — Elton Williams
(74) *Attorney, Agent, or Firm* — FIG. 1 Patents

(57) ABSTRACT

Embodiments of the present disclosure relate to methods, apparatuses, and systems for intelligent interference management and radio resource management. According to an embodiment of the present disclosure, a system can include: a RPA module that determines whether an event triggering a network change occurs; a CSP module coupled to the RPA module via a first interface, wherein the CSP module updates a channel model for the network based on the event or periodically; a RSS module coupled to the RPA module via a second interface, wherein the RSS module updates a RRM model based on the event or periodically; and a RRM module coupled to the RSS module via a third interface, wherein the RRM module arranges radio resource to one or more base stations based on the RRM model. Embodiments of the present disclosure can mitigate signaling overhead as well as latency.

19 Claims, 10 Drawing Sheets

(56) References Cited

U.S. PATENT DOCUMENTS

| | | | |
|---|---|---|---|
| 2017/0245165 A1 | 8/2017 | Onggosanusi et al. | |
| 2019/0320332 A1 | 10/2019 | Halabian et al. | |
| 2019/0335475 A1 | 10/2019 | Liang et al. | |
| 2020/0076520 A1* | 3/2020 | Jana | H04B 17/327 |

FOREIGN PATENT DOCUMENTS

| | | |
|---|---|---|
| CN | 105430659 A | 3/2016 |
| CN | 108112088 A | 6/2018 |
| WO | 2015149812 A1 | 10/2015 |
| WO | 2019077749 A1 | 4/2019 |

OTHER PUBLICATIONS

CMCC, "Status Report for SI on remote interference management for NR", 3GPP TSG RAN meeting #82, RP-182510, Sorrento, Italy, Dec. 2018, 15 pages.

Ericsson, "A comparison of CSI-RS activation schemes based on MAC CE and DCI", 3GPP TSG-RAN WG1 #90bis, R1-1718439, Prague, Czech Republic [retrieved Aug. 25, 2022]. Retrieved from the Internet <https://www.3gpp.org/ftp/TSG_RAN/WG1_RL1/TSGR1_90b/Docs/?sortby-sizerev>., Oct. 2017, 4 Pages.

PCT/CN2020/077031, "International Preliminary Report on Patentability", PCT Application No. PCT/CN2020/077031, Sep. 9, 2022, 5 pages.

PCT/CN2020/077031, "International Search Report and Written Opinion", PCT Application No. PCT/CN2020/077031, Nov. 27, 2020, 6 pages.

20920934.5, "Communication Pursuant to Rule 164(1) EPC", EP Application No. 20920934.5, Oct. 20, 2023, 18 pages.

5G Americas, "5G At the Edge", 5G Americas Whitepaper [retrieved Oct. 30, 2023]. Retrieved from the Internet <https://www.5gamericas.org/5g-at-the-edge/>, Oct. 2019, 59 pages.

KT, et al., "WG1 Deliverables Draft", Telecommunication Standardization Sector, Focus Group on Machine Learning for Future Networks Including 5G, ML5G-I-094-R5 [retrieved Nov. 28, 2018]. Retrieved from the Internet <https://extranet.itu.int/sites/itu-t/focusgroups/ML5G/input/ML5G-I-094-R5.DOCX>, Nov. 2018, 20 pages.

20920934, "Extended European Search Report", EP Application No. SEC920190136-EP-EPT, Jan. 23, 2024, 14 pages.

* cited by examiner

METHODS, APPARATUSES, AND SYSTEMS FOR INTELLIGENT INTERFERENCE MANAGEMENT AND RADIO RESOURCE MANAGEMENT

TECHNICAL FIELD

Embodiments of the present disclosure generally relate to wireless communication technology, and in particular to methods, apparatuses, and systems for intelligent interference management and radio resource management.

BACKGROUND

Traditionally, to detect interference in a cell, a base station usually does a radio-frequency (RF) sweep. However, the RF sweep requires extra hardware support and takes extra time. Another way to detect interference is to sense interference from users' reports. However, the report from a user equipment (UE) may be delayed and cannot rule out the impact of fast fading. In this sense, both ways have inevitable flaws.

In addition, in the current radio access network (RAN), each base station allocates radio resource within its cell independently. This decentralized radio resource management mechanism may lead to inter-cell interference. Existing solutions for solving the inter-cell interference may include inter cell interference coordination (ICIC) and enhanced ICIC (eICIC). However, these solutions heavily rely on inter-cell signaling exchange, and thus may bring heavy signaling overhead over X2 interface between the base stations. Besides, in these solutions, users in a cell are coarsely categorized into center users and edge users, and each category of users uses different frequency band, which may also waste radio resource greatly.

Therefore, the industry desires an improved technology for intelligent interference management and radio resource management to solve the above problems.

SUMMARY OF THE APPLICATION

Some embodiments of the present disclosure provide a technical solution for intelligent interference management and radio resource management.

According to some embodiments of the present disclosure, a system may include: a radio resource management (RRM) performance analysis (RPA) module that determines whether an event indicating a network change occurs; a channel status prediction (CSP) module coupled to the RPA module via a first interface, wherein the CSP module updates a channel model for the network based on the event or periodically; a RRM scheme selection (RSS) module coupled to the RPA module via a second interface, wherein the RSS module updates a RRM model based on the event or periodically; and a RRM module coupled to the RSS module via a third interface, wherein the RRM module arranges radio resource to one or more base stations based on the RRM model.

In an embodiment of the present disclosure, the CSP module may further launch a channel model training procedure to obtain an on-training channel model. The RPA module may compare network performances achieved by the channel model and the on-training channel model, in the case that the network performance achieved by the on-training channel model outperforms the network performance achieved by the channel model with a gain equal to or larger than a second threshold, the RPA determines that the on-training channel model will be used as the channel model In another embodiment of the present disclosure, the RSS module may further launch a RRM model training procedure to obtain an on-training RRM model. The RPA module may compare network performances achieved by the RRM model and the on-training RRM model, in the case that the network performance achieved by the on-training RRM model outperforms the network performance achieved by the RRM model with a gain equal to or larger than a third threshold, the RPA determines that on-training RRM model will be used as the RRM model.

In yet another embodiment of the present disclosure, the system may further include at least one of: a data base (DB) coupled to the CSP module via a fourth interface, coupled to the RSS module via a fifth interface, and coupled to the RRM module via a sixth interface; a radio-network information base (RIB) coupled to the CSP module via a seventh interface, coupled to the RPA module via an eighth interface, and coupled to the RSS module via a ninth interface; an open-central unit (O-CU) and open-distributed unit (O-DU) module coupled to the RPA module via a tenth interface; and a lower-level protocol module coupled to the RRM module via an eleven interface.

In yet another embodiment of the present disclosure, the RPA module may determine a channel model similarity between a first geographic region and a second geographic region. In response to that the channel model similarity between the first geographic region and the second geographic region is larger than or equal to a fourth threshold, the RPA module may transmit a first message for deactivating channel state indicator (CSI) measurements in the first geographic region.

According to some other embodiments of the present disclosure, a method may include: determining, by a RPA module in a system, whether an event indicating a network change occurs; updating, by a CSP module in the system, a channel model for the network based on the event or periodically, wherein the CSP module coupled to the RPA module via a first interface; updating, by a RSS module in the system, a RRM model based on the event or periodically, wherein the RSS module is coupled to the RPA module via a second interface; and arranging, by a RRM module in the system, radio resource to one or more base station based on the RRM model, wherein a RRM module is coupled to the RSS module via a third interface.

According to some other embodiments of the present disclosure, a method may include: receiving, a first message for deactivating CSI measurements in a first geographic region from a system; and deactivating the CSI measurements in the first geographic region.

Some embodiments of the present disclosure also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present disclosure provide a technical solution for intelligent interference management and radio resource management. Accordingly, embodiments of the present disclosure can mitigate signaling overhead as well as latency in existing solutions for interference management and radio resource management, especially in the densified 5G radio network.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

Figure 1:
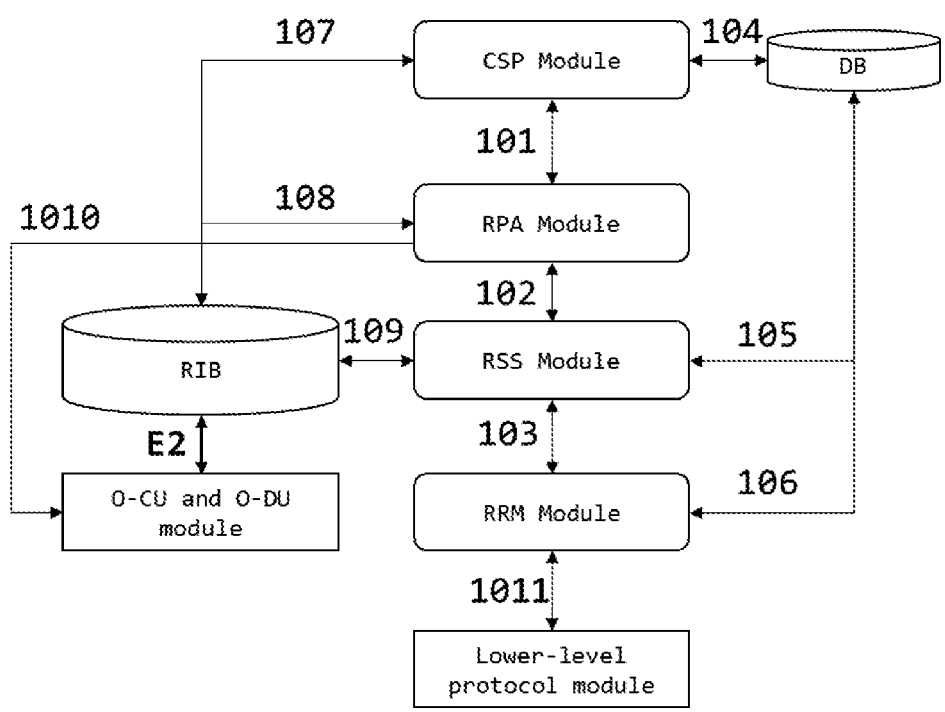
FIG. 1 illustrates a simplified block diagram of a system for intelligent interference management and radio resource management according to some embodiments of the present disclosure.

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings.

Traditionally, to detect interference in a cell, a base station usually does a radio-frequency (RF) sweep. However, RF sweep requires extra hardware support and takes extra time. Another way to detect interference is to sense interference from users' reports. However, the report from a UE may be delayed and cannot rule out the impact of fast fading. In this sense, both ways have inevitable flaws. These flaws may be more obvious in 5G networks. Specifically, since 5G networks are deployed more densely, current real-time interference measurement and the related interference information collecting mechanism in radio network will induce overwhelming overhead in densified 5G networks.

In addition, in the current RAN, each base station allocates radio resource within its cell independently. This decentralized radio resource management mechanism may lead to inter-cell interference. Existing solutions for solving the inter-cell interference may include ICIC and eICIC. However, these solutions heavily rely on inter-cell signaling exchange, and thus may bring heavy signaling overhead over X2 interface between the base stations. Besides, in these solutions, users in a cell are coarsely categorized into center users and edge users, and each category of users uses different frequency band, which may also waste radio resource greatly. Accordingly, traditional decentralized RRM approaches in current RAN cannot handle inter-cell interference effectively, which may degrade the network performance.

Using a machine learning (ML) method to predict interference and manage radio resource may be a promising direction to solve the above problems. Artificial neural network (ANN), as a universal problem solver in the ML method, could achieve relatively high precision in predicting interference by mining large data generated during the radio network operating. However, the training process may take massive amount of time. The same problem may also happen in using ML method to allocate radio resource. To train a usable model, it needs data of tens, even hundreds of thousands of transmission intervals and massive amount of time, which makes these RRM approaches feasible theoretically but unacceptable practically. To alleviate the problem, the model could be trained offline by interacting with a simulator. However, the network situation in the real network is different from that in the network created by the simulator, and thus the model trained by the simulator may degrade the network performance when it is used in the real network.

Given the above, some embodiments of the present disclosure provide a centralized intelligent interference and resource management framework to solve the above problems. The proposed framework may be operated on wireless network architectures that support the centralized deployment, for example, an open-RAN (O-RAN) architecture.

FIG. 1 illustrates a simplified block diagram of a system for intelligent interference management and radio resource management according to some embodiments of the present disclosure.

Referring to FIG. 1, the system may include a plurality of functional entities. Each functional entity may be implemented by software, hardware, or a combination of software and hardware. Each functional entity may be implemented in separate network entities or a single network entity. The plurality of functional entities may include:

RPA module: this entity may analyze current network performance and take actions based on the analysis. For example, to monitor the network status and offer decision for network performance enhancement, the RPA module regularly monitors the network performance metrics and notifies RSS module and/or CSP module to update model and/or algorithm.

CSP module: this entity may be coupled to the RPA module via a first interface (for example, interface 101 as shown in FIG. 1). This entity may predict channel model (for example, interference status and/or channel parameters) based on historical measurements and scheduling data.

For example, the CSP module may use ML-powered algorithms (for example, non-linear regression algorithm and/or neural network algorithm) to relatively precisely predict channel status parameters and build channel model without any extra overhead or hardware requirement. Precisely getting global channel model with little cost is the major merit of this module.

RSS module: this entity may be coupled to the RPA module via a second interface (for example, interface 102 as shown in FIG. 1). This entity may discover suitable trained model and/or ML algorithm for the RRM module.

For example, by using the channel model generated by the CSP module, the RSS module may train RRM models that fit the real radio network environment, and then the trained RRM modules may be used to allocate radio resource globally with better inter-cell interference avoidance, thereby achieving better network performance.

RRM module: this entity may be coupled to the RSS module via a third interface (for example, interface 103 as shown in FIG. 1). This entity may be in charge of radio resource management.

DB: this entity may be coupled to the CSP module via a fourth interface (for example, interface 104 as shown in FIG. 1), coupled to the RSS module via a fifth interface (for example, interface 105 as shown in FIG. 1), and coupled to the RRM module via a sixth interface (for example, interface [6] as shown in FIG. 1). This entity may store the channel models created by the CSP module.

RIB: this entity may be coupled to the CSP module via a seventh interface (for example, interface 107 as shown in FIG. 1), coupled to the RPA module via an eighth interface (for example, interface 108 as shown in FIG. 1), and coupled to the RSS module via a ninth interface (for example, interface 109 as shown in FIG. 1). This entity may collect and store all the information generated in radio network.

O-CU and O-DU module: this entity may be coupled to the RPA module via a tenth interface (for example, interface 1010 as shown in FIG. 1), and coupled to the RIB via an E2 interface in existing O-RAN architecture. This entity may stand for O-CU and O-DU in existing O-RAN architecture.

Lower-level protocol module: this entity may be coupled to the RRM module via an eleven interface (for example, interface 1011 as shown in FIG. 1). This entity may stand for lower-level protocols that RRM module may directly interact with.

The system as shown in FIG. 1 may be implemented in an existing O-RAN architecture. For example, FIG. 2 illustrates a simplified block diagram of a system implemented on O-RAN architecture for intelligent interference management and radio resource management according to some embodiments of the present disclosure.

Figure 2:
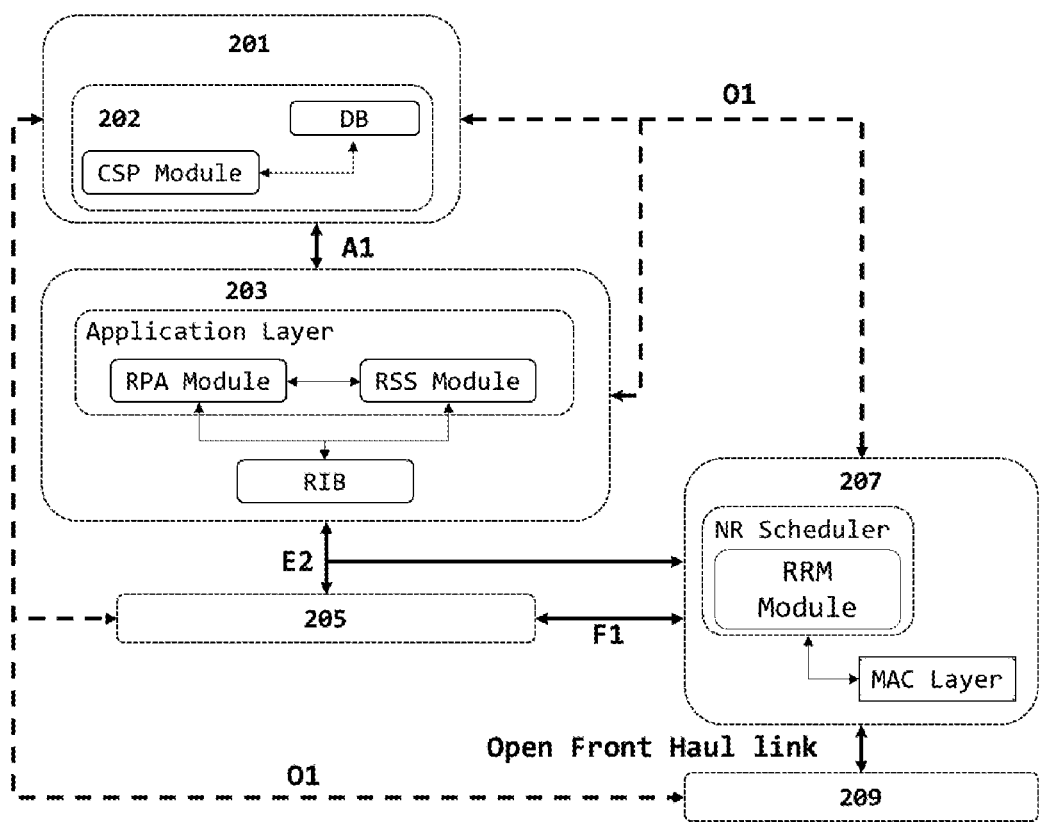
FIG. 2 illustrates a simplified block diagram of a system implemented in an O-RAN architecture for intelligent interference management and radio resource management according to some embodiments of the present disclosure.

As shown in FIG. 2, the existing O-RAN architecture may include five elements as follows.

Service management and orchestration framework 201, which is responsible for the management and orchestration of the managed elements under its span of control. The service management and orchestration framework 201 may be coupled to O-RAN distributed unit (O-DU) 207 and O-RAN radio unit (O-RU) 209 via O1 interface.

The service management and orchestration framework 201 may include an O-RAN non-real-time RAN intelligent controller 202 (also referred to as non-RT RIC 202), which is a logical function that enables non-real-time control and optimization of RAN elements and resources, artificial intelligence (AL)/ML workflow including model training and updates, and policy-based guidance of applications/features in O-RAN near-real-time RAN intelligent controller 203 (also referred to as near-RT RIC 203). The non-RT RIC 202 may be coupled to the near-RT RIC 203 via A1 interface.

O-RAN near-real-time RAN intelligent controller 203 (also referred to as near-RT RIC 203), which is a logical function that enables near-real-time control and optimization of O-RAN elements and resources via fine-grained data collection and actions over E2 interface. The near-RT RIC 203 may include a RIB which is coupled to an O-RAN central unit (O-CU) 205 via an E2 interface.

O-RAN central unit 205 (also referred to O-CU 205), which is a logical node hosting radio resource control (RRC) protocol, service data adaptation protocol (SDAP), and packet data convergence protocol (PDCP). The O-RAN central unit 205 may be coupled to an O-DU 207 via a F1 interface.

O-RAN distributed unit 207 (also referred to as O-DU 207), which is a logical node hosting radio link control (RLC)/media access control(MAC)/high-physical (PHY) layers based on a lower layer functional split. The O-RAN distributed unit 207 may be connected to an O-RU 209 via an open front haul link.

O-RAN radio unit 209 (also referred to as O-RU 209), which is a logical node hosting low-PHY layer and RF processing based on a lower layer functional split.

The above elements and interfaces may be existed in the existing O-RAN architecture. To enable the O-RAN architecture to achieve intelligent interference management and radio resource management, the new entities in FIG. 1 and the interfaces between these new entities may be added to the existing O-RAN architecture.

For example, as shown in FIG. 2, considering the lifecycle of channel models, DB and CSP module may be placed inside the non-RT RIC 202, along with their interface 104.

The RPA module and RSS module are conducting in a near-real-time manner, and thus the RPA module and RSS module may be placed in an application layer of the near-RT RIC 203, with their interface 102. The RPA module and RSS module are both connected to the RIB via interfaces 108 and 109 respectively, and thus interface 108 and 109 are also placed inside the near-RT RIC 203.

CSP module is connected to the RPA module via interface 101 and connected to the RIB via interface 107, and DB is connected to RSS module via interface 105. Therefore, those interfaces are mapped to A1 interface. Moreover, the RPA module is connected to O-CU and O-DU module via interface 1010, thus interface 1010 should be mapped to E2 interface.

According the definition of control loops in O-RAN specification, O-DU 207 takes charge of radio resource scheduling per transmission time interval (TTI). Accordingly, the RRM module may be placed in a new radio (NR) scheduler within the O-DU 207. Interface [6] between DB and RRM module may be mapped to O1 interface. Interface 103 between RRM module and the RRS module may be mapped to E2 interface. Interface 1011 between the RRM module and the low-level protocol module may be mapped to an interface between the NR scheduler and a MAC layer inside the O-DU 207.

Persons skilled in the art can understand that the above implementing scheme is just for illustrative purpose only. Considering the O-RAN compatibility, standardization requirements and other factors, the implementing scheme may be adjusted.

According to some embodiments of the present disclosure, at each transmission time interval (TTI) end, the O-CU and O-DU module may transmit the information related to the radio network to the RIB. For example, FIG. 3 illustrates a method for RIB gathering data according to some embodiments of the present disclosure.

Figure 3:
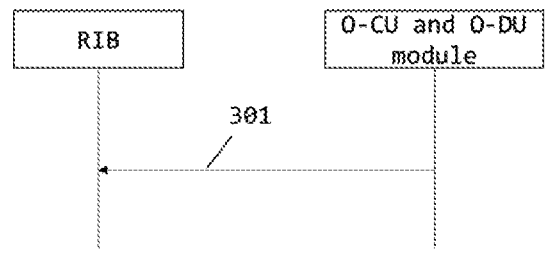
FIG. 3 illustrates a method for RIB gathering data according to some embodiments of the present disclosure.

Referring to FIG. 3, at each TTI end, the O-CU and O-DU module may transmit a message 301 to RIB via the E2 interface, the message 301 may be a DataUpload message which includes the information related to the radio network.

For example, the DataUpload message may include at least one of: current timestamp; current TTI number; list of base stations/access points; list of active users; transmission power of each user/base station; one or more users' buffer status; one or more users' buffer status for the services with high quality of service (QoS) requirements; QoS of services for one or more users; QoS fulfillment status of each user's services; CSI report of one or more users; (reference signal receiving power) RSRP and reference signal receiving quality (RSRQ) measurements; wireless resource allocation schemes including channel allocation schemes and power allocation schemes; one or more user' mobility state; one or more user' handover requests.

According to some embodiments of the present disclosure, the RSS module may acquire data from the RIB. For example, FIG. 4 illustrates a method for RSS module acquiring data according to some embodiments of the present disclosure.

Figure 4:
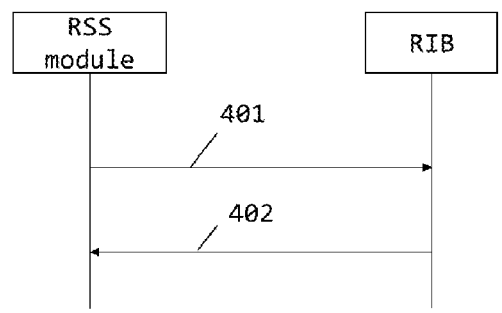
FIG. 4 illustrates a method for RSS module acquiring data according to some embodiments of the present disclosure.

Referring to FIG. 4, the RSS module may transmit a message 401 to request data from the RIB via interface 109. The message 401 may be an InfoRequest message, which includes at least one of: timestamp of last InfoRespond message; current timestamp; and list of data items requested from the RIB.

The list of data items requested from the RIB may include at least one of: resource allocation schemes generated and gathered since last InfoRespond message; channel measurements corresponding to resource allocation schemes; one or more users' buffer state in each TTI since last InfoRespond message; one or more users' buffer status for the services with high QoS requirements in each TTI since last InfoRespond message; modulation and coding scheme (MCS) of each user in each TTI since last InfoRespond message.

After receiving the message 401, the RIB may search and organize data according to the message 401, and then transmit a message 402 to the RSS module via interface 109. The message 402 may be an InfoRespond message which includes at least one of: current timestamp; and data requested in the list of data items in the message 401.

According to some embodiments of the present disclosure, the RPA module may acquire data from the RIB. For example, FIG. 5 illustrates a method for RPA module acquiring data according to some embodiments of the present disclosure.

Figure 5:
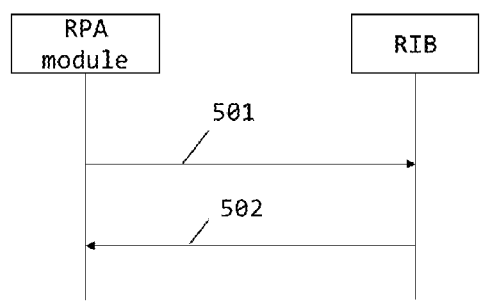
FIG. 5 illustrates a method for RPA module acquiring data according to some embodiments of the present disclosure.

Referring to FIG. 5, the RPA module may transmit a message 501 to request data from the RIB via interface 108. The message 501 may be a MetricRequest message, which includes at least one of: timestamp of last MetricRequest message; current timestamp; and list of metric-related items requested from the RIB.

The list of metric-related items requested from the RIB may include at least one of: resource allocation schemes generated and gathered since last MetricNotice message; channel measurements corresponding to resource allocation schemes; MCS of each user in each TTI since last MetricNotice message; average packet delay of each user; access of one or more new users; one or more users' handover request.

After receiving the message 501, the RIB may search and organize data according to the message 501, and then transmit a message 502 to the RPA module via interface 108. The message 502 may be a MetricNotice message which includes at least one of: current timestamp; QoS fulfillment of each user; and data requested in the list of metric-related items in the message 501.

According to some embodiments of the present disclosure, the RPA module may determine whether an event indicating a network change occurs. For example, the RPA module may determine whether an event indicating a network change occurs based on data (for example, the data in the message 502) received from the RIB. Depending on different kinds of events detected by the RPA module, the RPA module may indicate the CSP module to update channel model and/or the RSS module to update the RRM model.

According to some embodiments of the present disclosure, the event detected by the RPA module may include one or more of: a predicted deviation of the channel model of the network beyond a first threshold; and a discovery of at least one new user in the network. After detecting the above event, the RPA module may indicate the CSP module to update a channel model as shown in FIG. 6.

Figure 6:
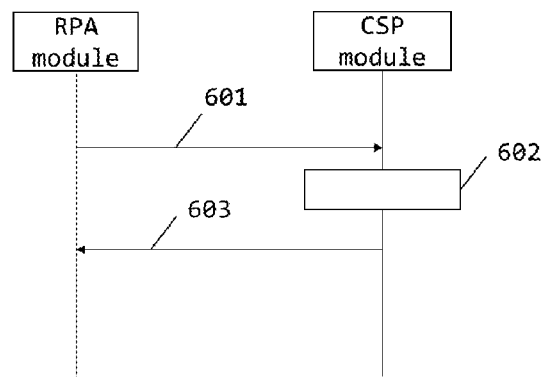
FIG. 6 illustrates a method for updating channel model according to some embodiments of the present disclosure.

Referring to FIG. 6, it illustrates a method for updating channel model according to some embodiments of the present disclosure. After detecting the above event, the RPA module may transmit a message 601 to the CSP module via interface 101. The message 601 may be a ChangeNotice message which includes at least one of: current timestamp; type of detected event; and additional information for the event (for example, UEs' identities (IDs) of new users if the event is the discovery of new users).

After receiving the message 601, the CSP module may initialize a channel model update procedure 602 to update the channel mode. After the update is finished, the CSP module may transmit a message 603 to the RPA module. The message 603 may be a ModelUpdate message and include at least one of: current timestamp; and the updated channel model.

Figure 7:
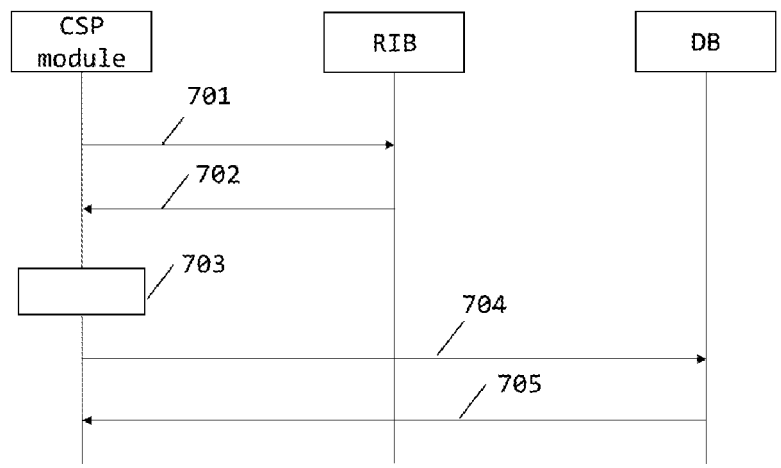
FIG. 7 illustrates a channel model update procedure according to some embodiments of the present disclosure.

FIG. 7 illustrates a channel model update procedure (for example, procedure 602 in FIG. 6) according to some embodiments of the present disclosure.

Referring to FIG. 7, the CSP module may transmit a first request (for example, request 701) to the RIB to request necessary data for channel model update via interface 107. The request 701 may be a DataRequest message which includes at least one of: current timestamp; amount of data items requested from RIB; list of data items requested from RIB.

The list of data items requested from RIB may include at least one of: list of users; list of base stations; association relationship between users and base stations; a certain number of the most recent resource allocation schemes generated and gathered for each user; channel measurements corresponding to the resource allocation schemes.

After receiving the request 701, the RIB may search and organize data according to the request 701, and then transmit first information (for example, information 702) to the CSP module via interface 107. The information 702 may be a DataRespond message which includes at least one of: current timestamp; and list of data requested in the list of data items in request 701.

After receiving the information 702, the CSP module may begin a training process 703 to train a new channel model. Once the training process is completed, the CSP module may transmit a message 704 to the DB via interface 104. The message 704 may be a ModelUpdate message which includes the same content as message 603 in FIG. 6.

After receiving the message 704, the DB may store the updated channel model, and then transmit a message 705 to the CSP module. The message 705 may be an UpdateFinish message which include at least one of: current timestamp; status (for example, completed or failed); and reason of failure. The reason of failure may include one or more of: message is corrupted or incomplete; an updating/switching process is running.

As stated above, the channel model update procedure as shown in FIG. 7 may be triggered based on a message (for example, message 601) from the RPA module. However, according to some other embodiments of the present disclosure, the channel model update procedure as shown in FIG. 7 may be performed periodically. In these embodiments, the CSP module may keep a timer for updating the channel model. The timer may be restarted once the channel model is updated. Once the timer expires, the RPA module may begin the channel model update procedure as shown in FIG. 7 to update the channel model.

To prevent the inconsistency of channel models stored in the DB and used by the RRM module. After the DB stores the updated channel model in FIG. 7, it may indicate the update of channel model to the RRM module. For example, FIG. 8 illustrates a method for RRM module updating channel model according to some embodiments of the present disclosure.

Figure 8:
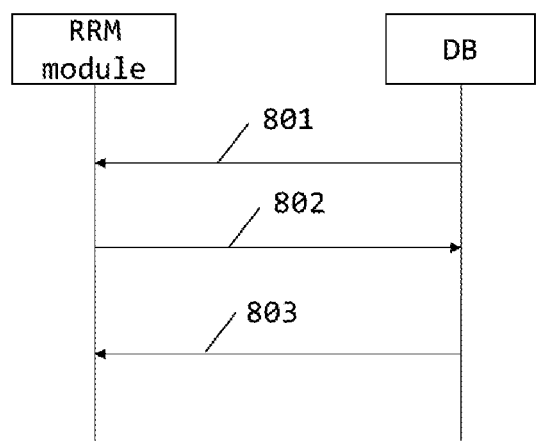
FIG. 8 illustrates a method for RRM module updating channel model according to some embodiments of the present disclosure.

Referring to FIG. 8, after storing the updated channel model, the DB may transmit a message 801 to the RRM module via interface [6]. The message 801 may be a ModelUpdNotice message which includes current timestamp. The message 801 may indicate the update of the channel model. During the current TTI, the RRM module may still use the old channel model in resource allocation. After the current TTI, the RRM module may transmit a message 802 to the DB to request the updated channel module. The message 802 may be a ModelRequest message which includes the current timestamp. After receiving the message 802, the DB may transmit a message 803 to the RRM module. The RRM module 803 may be a ModelRespond message which includes at least one of: current timestamp; and the updated channel model.

Figure 9:
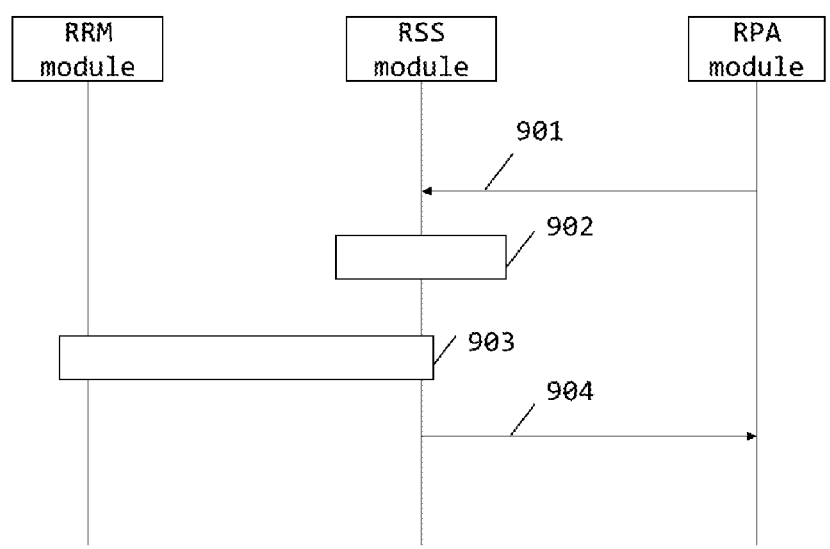
FIG. 9 illustrates a method for updating RRM model according to some embodiments of the present disclosure.

According to some other embodiments of the present disclosure, the event detected by the RPA module may include one or more of: QoS can't be fulfilled for a least one user in the network for a predefined timespan; an overall network performance for the network degrading for a predefined timespan; and a discovery of at least one new user in the network. The predefined timespan may include one or more TTIs. After detecting the above event, the RPA module may indicate the RSS module to update RRM model as shown in FIG. 9. According to some other embodiments of the present disclosure, the RRM model may refer to a RRM algorithm. Persons skilled in the art can understand that although the RRM model may be replaced with RRM algorithm according to some embodiments of the present disclosure, the procedures regarding them are the same.

Referring to FIG. 9, it illustrates a method for updating RRM model according to some embodiments of the present disclosure. After detecting the above event, the RPA module may transmit a message 901 to the RSS module via interface 102. The message 901 may be a ChangeNotice message which includes at least one of: current timestamp; type of detected event; and additional information for the event (for example, UEs' identities (IDs) of new users if the event is the discovery of new users).

After receiving the message 901, the RSS module may initialize a RRM model update procedure 902 to update the RRM model. After the update is finished, the RRM module may perform a RRM model switch procedure 903 with the RRM module to switch the RRM model used in the RRM module. After the switch procedure 903 is finished, the RSS module may transmit a message 904 to the RPA module. The message 904 may be an UpdateFinish message which include at least one of: current timestamp; status (for example, completed or failed); and reason of failure. The reason of failure may include one or more of: message is corrupted or incomplete; an updating/switching process is running.

Figure 10:
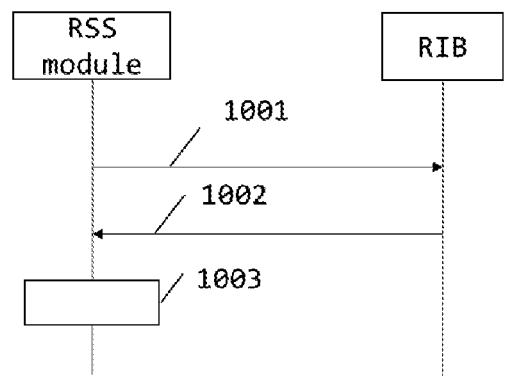
FIG. 10 illustrates a RRM model update procedure according to some embodiments of the present disclosure.

FIG. 10 illustrates a RRM model update procedure (for example, procedure 902 in FIG. 9) according to some embodiments of the present disclosure.

Referring to FIG. 10, the RSS module may transmit a second request (for example, request 1001) to the RIB message to request necessary data for RRM model update via interface 109. The request 1001 may be a DataRequest message which includes at least one of: current timestamp; amount of data items requested from RIB; list of data items requested from RIB.

The list of data items requested from RIB may include at least one of: list of users; list of base stations; association relationship between users and base stations; a certain number of the most recent resource allocation schemes generated and gathered for each user; channel measurements corresponding to the resource allocation schemes.

After receiving the request 1001, the RIB may search and organize data according to the message 1001, and then transmit second information (for example, information 1002) to the RSS module via interface 109. The information 1002 may be a DataRespond message which includes at least one of: current timestamp; and list of data requested in the list of data items in message 1001. After receiving the information 1002, the RSS module may begin a training process 1003 to train a new RRM model.

As stated above, the RRM model update procedure as shown in FIG. 10 may be triggered based on a message (for example, message 901) from the RPA module. However, according to some other embodiments of the present disclosure, the RRM model update procedure as shown in FIG. 10 may be performed periodically. In these embodiments, the RSS module may keep a timer for updating the RRM model. The timer may be restated once the RRM model is updated. Once the timer expires, the RSS module may begin the RRM model update procedure as shown in FIG. 10 to update the channel module.

Once the training process 1003 in FIG. 10 is completed, the RSS module may perform a RRM model switch procedure with the RRM module to switch the RRM model used in RRM module. For example, FIG. 11 illustrates a RRM model switch procedure (for example, the procedure 903 in FIG. 9) according to some embodiments of the present disclosure.

Figure 11:
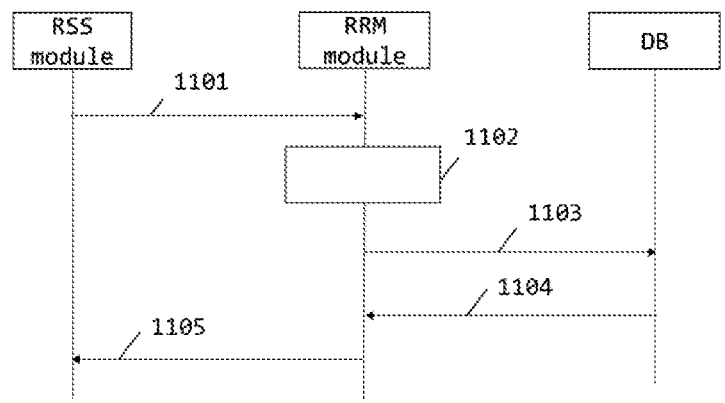
FIG. 11 illustrates a RRM model switch procedure according to some embodiments of the present disclosure.

Referring to FIG. 11, after the training process 1003 in FIG. 10 is completed, the RSS module may transmit a message 1101 to the RRM module via interface 103. The message 1101 may be a SwitchOrder message which includes at least one of:

current timestamp; what to switch (for example, whether RRM model or RRM algorithm to be switched); the updated RRM model or RRM algorithm. After receiving the message 1101, the RRM module may perform a RRM model or RRM algorithm switching procedure to switch to the updated RRM model or RRM algorithm.

After the switching procedure finished, the RRM module may transmit a third request (for example, a request 1103) to the DB to request a latest channel module via interface 106. The request 1103 may be a ModelRequest message which includes the current timestamp. After receiving the request 1103, the DB may transmit a message 1104 to the RRM module. The message 1104 may be a ModelRespond message which includes at least one of: current timestamp; and the latest channel model. After that, the RRM module may transmit a message 1105 to the RSS module. The message 1105 may be an UpdateFinish message which includes the same content as that in message 705.

According to some embodiments of the present disclosure, the RRM module may arrange radio resource to one or more base stations based on the RRM model. For example, FIG. 12 illustrates a method for allocating radio resources according to some embodiments of the present disclosure.

Figure 12:
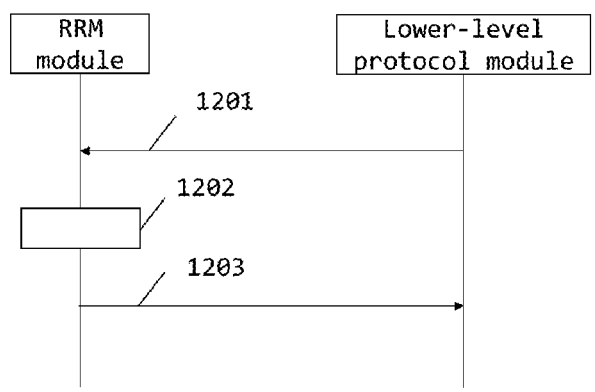
FIG. 12 illustrates a method for allocating radio resources according to some embodiments of the present disclosure.

Referring to FIG. 12, at each TTI, the RRM module may receive a message 1201 from the lower-level protocol module via interface [11]. The message 1201 may be a RRM-Request message which includes at least one of: current timestamp; TTI number; users to be scheduled; buffer size of each user; scheduling bytes of services with high QoS requirement of each user.

After receiving the message 1201, the RRM module may use the RRM module or run the RRM algorithm to allocate radio resource in procedure 1202. Once the radio resource allocating procedure is finished, the RRM module may transmit a message 1203 to the lower-level protocol module. The message 1203 may be a RRMResult message which includes at least one of: current timestamp; TTI number; list of scheduling results.

According to some embodiments of the present disclosure, the CSP module may generate or update a channel model after a channel model training procedure is finished, and then the CSP module may transmit the generated or updated channel model to the DB such that the generated or updated channel model may be used as the channel model in the network by other entities. Once the generated or updated channel model is ready to be used by other functional entities, the CSP module may launch a new channel model training procedure to obtain an on-training channel model. The channel model which is ready to be used by other functional entities may be referred to as in-use channel model.

When the in-use channel model is applied to perform RRM or other functions, the RPA can also utilize its corresponding on-training channel model for the RRM. In an embodiment of the present disclosure, the RPA module may compare network performances achieved by the in-use channel model and the on-training channel model, in the case that the network performance achieved by the on-training channel model outperforms the network performance achieved by the in-use channel model with a gain equal to or larger than a second threshold, the RPA may determine that the on-training channel model will be used as the channel model in the network.

According to some embodiments of the present disclosure, the RSS module may generate or update a RRM model after a RRM model training procedure is finished, and thus the generated or updated RRM model may be used as the RRM model in the network by other entities. Once the generated or updated RRM model is ready to be used by other functional entities, the RSS module may launch a new RRM model training procedure to obtain an on-training RRM model. The RRM model which is ready to be used by other functional entities may be referred to as in-use RRM model.

When the in-use RRM model is applied to perform RRM or other functions, the RPA can also utilize its corresponding on-training RRM model for the RRM. In an embodiment of the present disclosure, the RPA module may compare network performances achieved by the in-use RRM model and the on-training RRM model, in the case that the network performance achieved by the on-training RRM model outperforms the network performance achieved by the RRM model with a gain equal to or larger than a third threshold, the RPA may determine that on-training RRM model will be used as the RRM model in the network.

According to some embodiments of the present disclosure, to further reduce cost of channel measurements and reports, the RPA module may determine a channel model similarity between a first geographic region and a second geographic region. Each of the first geographic region and the second geographic region may include at least one base station and at least one user. In an embodiment of the present disclosure, the channel model similarity may be evaluated by a cosine similarity metric.

In the case that the channel model similarity between the first geographic region and the second geographic region is larger than or equal to a fourth threshold, it means that the first geographic region and the second geographic region may have high similarity for channel model. To reduce cost of channel measurements and reports, the RPA may determine to deactivate CSI measurements in one region with heavy traffic. According to some embodiments of the present disclosure, deactivating CSI measurements may refer to deactivating CSI measurements and reports. Reactivating CSI measurements may refer to reactivating CSI measurements and reports.

Figure 13:
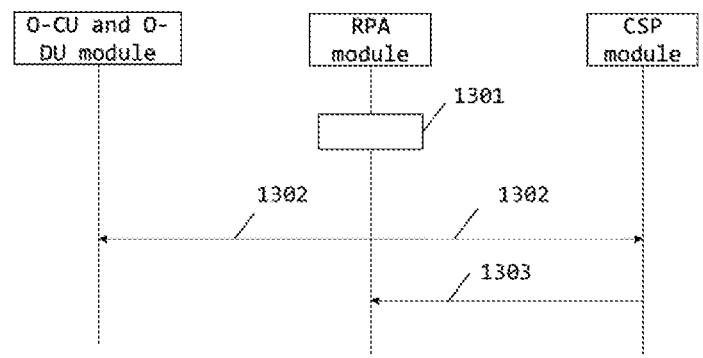
FIG. 13 illustrates a method for deactivating/reactivating CSI measurements according to some embodiments of the present disclosure.

For example, FIG. 13 illustrates a method for deactivating/reactivating CSI measurements according to some embodiments of the present disclosure.

As shown in FIG. 13, at step 1301, the RPA module may detect the high similarity between the first geographic region and the second geographic region (for example, the channel model similarity between the first geographic region and the second geographic region is larger than or equal to a fourth threshold), the RPA module may directly transmit a first message (for example, message 1302) for deactivating CSI measurements in the first geographic region to the O-CU and O-DU module and the CSP module via interfaces 1010 and 101, respectively. The message 1301 may be a SimNotice message which include at least one of: current timestamp; list type (for example, deactivation or reactivation); list of remain-activated users' ID; list of remain-activated cells'

ID; list of deactivated users' ID; and list of deactivated cells' ID. In an embodiment of the present disclosure, the RPA module may determine that the channel model in the second geographic region to be the channel model in the first geographic region.

After receiving the message 1302, the CSP module itself may determine whether a procedure of predicting (for example, generating or updating) channel model for the first geographic region should be stopped. For example, in the case that the deactivation affects the normal operation of the CSP module, CSP module may stop predicting channel model for the users within the first geographic region. However, regardless of the CSP module itself determining to stop predicting channel model or not, after receiving the message 1302, the CSP module may transmit a message 1303 to the RPA module. The message 1303 may be an UpdateFinish message which includes the same content as that in message 705.

After receiving the message 1302, the O-CU and O-DU module may indicate one or more base stations in the first geographic region to deactivate the CSI measurements.

Figure 14:
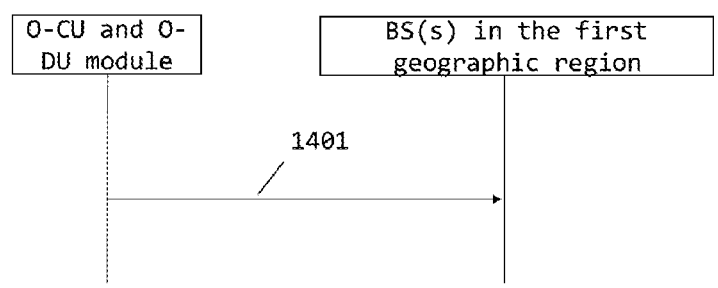
FIG. 14 illustrates a method for deactivating/reactivating CSI measurements according to some other embodiments of the present disclosure.

For example, FIG. 14 illustrates a method for deactivating/reactivating CSI measurements according to some other embodiments of the present disclosure. Referring to FIG. 14, after receiving the message 1302 from the RPA module, at step 1401, the O-CU and O-DU module may indicate one or more base stations (for example, by transmitting a first indication to one or more base stations) in the first geographic region whose cell ID(s) is included in the message 1302 to deactivate the CSI measurements. The first indication may be generated based on the message 1302. In an embodiment of the present disclosure, the O-CU and O-DU module may indicate all the base stations in the first geographic region to deactivate CSI measurements.

According to some embodiments of the present disclosure, multiple solutions for reactivating the CSI measurements in the first geographic region may be provided.

In an embodiment of the present disclosure, the first message (for example, message 1302) may include a first timer for reactivating the CSI measurements in the first geographic region. The O-CU and O-DU module may also indicate the first timer (for example, by including the first timer in the first indication) to the one or more base stations in the first geographic region. Once the CSI measurements are deactivated by a base station in the first geographic region, the base station may restart the timer. When the timer expires, the base station in the first geographic region may reactivate CSI measurements.

In another embodiment of the present disclosure, the reactivation will be triggered by an event, such as network performance degradation. For example, in the case that the RPA module determines that a network performance in the first geographic region falls below a fifth threshold or the network performance degradation of the first geographic region is beyond a predefined threshold, the RPA module may transmit a second message for reactivating the CSI measurements in the first geographic region. For example, the RPA module may directly transmit a second message to the O-CU and O-DU module and CSP module via interfaces 1010 and 101, respectively. The second message may be a SimNotice message which includes at least one of: current timestamp; list type (for example, reactivation in this message); list of reactivated users' ID; and list of reactivated cells' ID.

After receiving the second message, the CSP module may begin to predict channel model for users within the first geographic region once enough data is collected. After receiving the second message, the O-CU and O-DU module may indicate one or more base stations (for example, by transmitting a second indication to one or more base stations) in the first geographic region whose cell ID(s) is included in the second message to reactivate the CSI measurements. In an embodiment of the present disclosure, the O-CU and O-DU module may indicate all the base stations in the first geographic region to reactivate CSI measurements.

In yet another embodiment of the present disclosure, the RPA may receive a fourth request from at least one base station in the first geographic region. The fourth request may be a performance enhancement request. After receiving the fourth request, the RPA module may transmit a third message for reactivating the CSI measurements in the first geographic region. For example, the RPA module may directly transmit a third message to the O-CU and O-DU module and CSP module via interfaces 1010 and 101, respectively. The third message may be a SimNotice message which includes at least one of: current timestamp; list type (for example, reactivation in this message); list of reactivated users' ID; and list of reactivated cells' ID.

After receiving the third message, the CSP module may begin to predict channel model for users within the first geographic region once enough data is collected. After receiving the third message, the O-CU and O-DU module may indicate one or more base stations (for example, by transmitting a third indication to one or more base stations) in the first geographic region whose cell IDs is included in the third message to reactivate the CSI measurements. In an embodiment of the present disclosure, the O-CU and O-DU module may indicate all the base stations in the first geographic region to reactivate CSI measurements.

According to some embodiments of the present disclosure, the similarity detection could be expanded to inter-RAN level. If a channel model of another RAN has high similarity with the current RAN, then the CSI measurements could be deactivated for one of the RANs, and the RAN whose CSI measurements are deactivated may share the same channel model with the other ran, and the above solutions for reactivating the CSI measurements for a geographic region may also be applied to a RAN.

Figure 15:
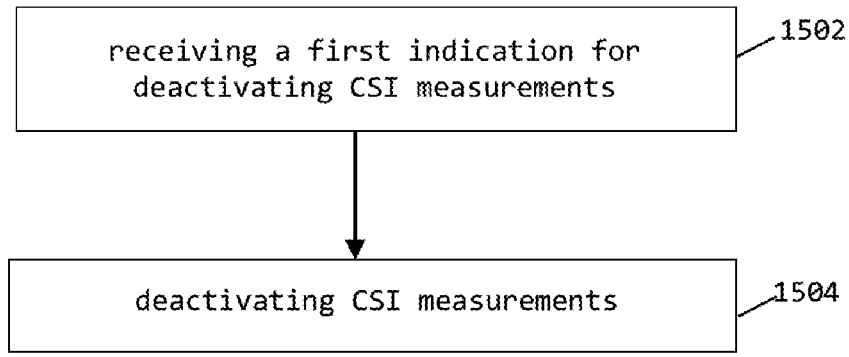
FIG. 15 illustrates a method for deactivating/reactivating CSI measurements according to some other embodiments of the present disclosure.

FIG. 15 illustrates a method for deactivating/reactivating CSI measurements according to some other embodiments of the present disclosure. The method may be performed by a base station in the first geographic region.

As shown in FIG. 15, at step 1502, a base station in the first geographic region may receive a first indication for deactivating CSI measurements in the first geographic region from a system (for example, the system as shown in FIG. 1). For example, the first indication may be directly transmitted from the O-CU and O-DU module and may be generated based on the first message. The first message may be a SimNotice message which is generated by the RPA module and include at least one of: current timestamp; list type (for example, deactivation or re-activation); list of remain-activated users' ID; list of remain-activated cells' ID; list of deactivated users' ID; and list of deactivated cells' ID. In fact, the first message may be transmitted to one or more base stations in the first geographic region. In an embodiment of the present disclosure, the first message may be transmitted to all the base stations in the first geographic region.

After receiving the first indication, in step 1504, the base station may deactivate CSI measurements. That is, the base station and one or more users served by the base station may not perform CSI measurements. According to some embodiments of the present disclosure, deactivating CSI measurements may refer to deactivating CSI measurements and reports. That is, the base station and one or more users served by the base station may not perform CSI measurements and not transmit the CSI reports to the system.

In an embodiment of the present disclosure, the first indication may include a first timer for reactivating the CSI measurements in the first geographic region. Once the CSI measurements are deactivated by the base station in the first geographic region, the base station may restart the timer. When the timer expires, the base station in the first geographic region may reactivate CSI measurements. According to some embodiments of the present disclosure, reactivating CSI measurements may refer to reactivating CSI measurements and reports to the system.

In another embodiment of the present disclosure, the base station may receive a second indication for reactivating the CSI measurements in the first geographic region from the system. For example, the second indication may be directly received from the O-CU and O-DU module and may be generated based on a second message. The second message may be a SimNotice message generated by the RPA module and includes at least one of: current timestamp; list type (for example, reactivation in this message); list of reactivated users' ID; and list of reactivated cells' ID. After receiving the second indication, the base station may reactivate CSI measurements. For example, the base station may reactivate CSI measurements performed by the base station and one or more users served by the base station. According to some embodiments of the present disclosure, reactivating CSI measurements may refer to reactivating CSI measurements and reports to the system.

In yet another embodiment of the present disclosure, the base station may transmit a fourth request to the system. For example, in the case that the base station determines network performance degradation in the first geographic region, the base station may transmit the fourth request to the system. The fourth request may be a performance enhancement request. The fourth request may be directly transmitted to the O-CU and O-DU module, and then the O-CU and O-DU module may transmit the fourth request to the RPA module of the system.

After transmitting the fourth request, the base station may receive a third indication for reactivating the CSI measurements in the first geographic region from the system. For example, the third indication may be directly received from the O-CU and O-DU module and may be generated based on a third message. The third message may be a SimNotice message generated by the RPA module and includes at least one of: current timestamp; list type (for example, reactivation in this message); list of reactivated users' ID; and list of reactivated cells' ID. After receiving the third indication, the base station may reactivate CSI measurements. For example, the base station may reactivate CSI measurements performed by the base station and one or more users served by the base station. According to some embodiments of the present disclosure, reactivating CSI measurements may refer to reactivating CSI measurements and reports to the system.

Figure 16:
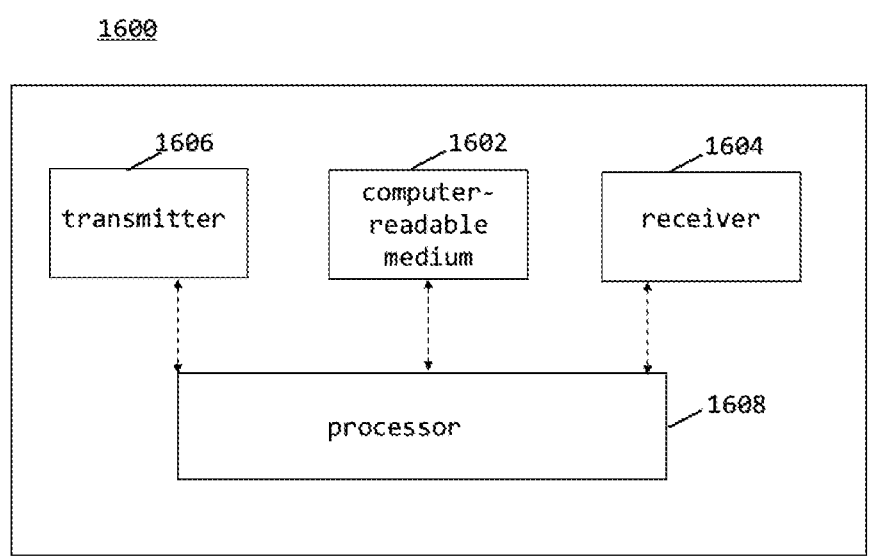
FIG. 16 illustrates a simplified block diagram of an apparatus for deactivating/reactivating CSI measurements according to some embodiments of the present disclosure.

FIG. 16 illustrates a simplified block diagram of an apparatus for deactivating/reactivating CSI measurements according to some embodiments of the present disclosure. The apparatus 1600 may be a base station.

Referring to FIG. 16, the apparatus 1600 may include at least one non-transitory computer-readable medium 1602, at least one receiver 1604, at least one transmitter 1606, and at least one processor 1608. In some embodiment of the present disclosure, at least one receiver 1604 and at least one transmitter 1606 and be integrated into at least one transceiver. The at least one non-transitory computer-readable medium 1602 may have computer executable instructions stored therein. The at least one processor 1608 may be coupled to the at least one non-transitory computer-readable medium 1602, the at least one receiver 1604 and the at least one transmitter 1606. The computer executable instructions can be programmed to implement a method with the at least one receiver 1604, the at least one transmitter 1606 and the at least one processor 1608. The method can be a method according to an embodiment of the present disclosure, for example, the method shown in FIG. 15.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. An apparatus, comprising:
   a radio resource management (RRM) performance analysis (RPA) module that determines whether an event indicating a network change occurs;
   a channel status prediction (CSP) module coupled to the RPA module via a first interface, wherein the CSP module updates a channel model for the network based on the event or periodically;
   an RRM scheme selection (RSS) module coupled to the RPA module via a second interface, wherein the RSS module updates an RRM model based on the event or periodically; and
   an RRM module coupled to the RSS module via a third interface, wherein the RRM module arranges radio resource to one or more base stations based on the RRM model.

2. The apparatus of claim 1, wherein the CSP module further launches a channel model training procedure to obtain an on-training channel model.

3. The apparatus of claim 1, wherein the RSS module further launches an RRM model training procedure to obtain an on-training RRM model.

4. The apparatus of claim 1, further comprising at least one of:
   a data base (DB) coupled to the CSP module via a fourth interface, coupled to the RSS module via a fifth interface, and coupled to the RRM module via a sixth interface;
   a radio-network information base (RIB) coupled to the CSP module via a seventh interface, coupled to the RPA module via an eighth interface, and coupled to the RSS module via a ninth interface;
   an open-central unit (O-CU) and open-distributed unit (O-DU) module coupled to the RPA module via a tenth interface; and
   a lower-level protocol module coupled to the RRM module via an eleven interface.

5. The apparatus of claim 4, wherein the CSP module transmits a first request to the RIB, receives first information for updating the channel model from the RIB, and updates the channel model based on the first information.

6. The apparatus of claim 5, wherein the CSP module indicates the update of channel model to the DB and the DB indicates the update of channel model to the RRM module.

7. The apparatus of claim 4, wherein the RSS module transmits a second request to the RIB, receives second information from the RIB, and updates the RRM model based on the second information.

8. The apparatus of claim 7, wherein the RSS module indicates the update of RRM model to the RRM module.

9. The apparatus of claim 8, wherein the RRM module transmits a third request to the DB to request a latest channel model.

10. The apparatus of claim 8, wherein the RRM module performs radio resource allocation at least based on the updated RRM model, and indicates a radio resource allocation to the lower-level protocol module.

11. The apparatus of claim 2,
    wherein the RPA module compares network performances achieved by the channel model and the on-training channel model,
    in a case that the network performance achieved by the on-training channel model outperforms the network performance achieved by the channel model with a gain equal to or larger than a second threshold, the RPA determines that the on-training channel model will be used as the channel model.

12. The apparatus of claim 3,
    wherein the RPA module compares network performances achieved by the RRM model and the on-training RRM model,
    in a case that the network performance achieved by the on-training RRM model outperforms the network performance achieved by the RRM model with a gain equal to or larger than a third threshold, the RPA determines that on-training RRM model will be used as the RRM model.

13. The apparatus of claim 4, wherein the RPA module determines a channel model similarity between a first geographic region and a second geographic region.

14. The apparatus of claim 13, wherein in response to the channel model similarity between the first geographic region and the second geographic region being larger than or equal to a fourth threshold, the RPA module transmits a first message for deactivating channel state indicator (CSI) measurements in the first geographic region.

15. The apparatus of claim 14, wherein the first message comprises a first timer for reactivating the CSI measurements in the first geographic region.

16. The apparatus of claim 14, wherein the RPA module determines a channel model in the second geographic region to be a channel model in the first geographic region.

17. A method, comprising:
    determining, by a radio resource management (RRM) performance analysis (RPA) module in a system, whether an event indicating a network change occurs;
    updating, by a channel status prediction (CSP) module in the system, a channel model for the network based on the event or periodically, wherein the CSP module coupled to the RPA module via a first interface;
    updating, by an RRM scheme selection (RSS) module in the system, an RRM model based on the event or periodically, wherein the RSS module is coupled to the RPA module via a second interface; and
    arranging, by an RRM module in the system, radio resource to one or more base station based on the RRM model, wherein a RRM module is coupled to the RSS module via a third interface.

18. The method of claim 17, wherein the event based on which the CSP module updates a channel mode comprises one or more of:
    a predicted deviation of the channel model of the network beyond a first threshold; and
    a discovery of at least one new user in the network.

19. The method of claim 17, wherein the event based on which the RSS model updates the RRM model comprises one or more of:
    quality of service (QOS) not fulfilled for a least one user in the network for a timespan;
    an overall network performance for the network worsening for a timespan; and
    a discovery of at least one new user in the network.

* * * * *